US012788006B2

(12) United States Patent
Warlick et al.

(10) Patent No.: US 12,788,006 B2
(45) Date of Patent: Nov. 10, 2026

(54) METHOD AND DEVICE TO PRESERVE ORGANS AND TISSUE FOR TRANSPLANTATION

(71) Applicant: SoftWave Tissue Regeneration Technologies, Inc., Kennesaw, GA (US)

(72) Inventors: John F. Warlick, Woodstock, GA (US); John Mullins, Jonesboro, GA (US); David Dean, Kennesaw, GA (US)

( * ) Notice: Subject to any disclaimer, the term of this patent is extended or adjusted under 35 U.S.C. 154(b) by 66 days.

(21) Appl. No.: 17/825,179

(22) Filed: May 26, 2022

(65) Prior Publication Data

US 2023/0380413 A1 Nov. 30, 2023

(51) Int. Cl.

| | |
|---|---|
| ***A01N 1/124*** | (2025.01) |
| ***A01N 1/122*** | (2025.01) |
| ***A01N 1/126*** | (2025.01) |
| ***A01N 1/16*** | (2025.01) |
| ***A01N 1/162*** | (2025.01) |
| ***A01N 1/165*** | (2025.01) |

(52) U.S. Cl.

CPC ............. *A01N 1/124* (2025.01); *A01N 1/122* (2025.01); *A01N 1/126* (2025.01); *A01N 1/16* (2025.01); *A01N 1/162* (2025.01); *A01N 1/165* (2025.01)

(58) Field of Classification Search

CPC .... A01N 1/0278; A01N 1/0289; A01N 1/021; A01N 1/124; A01N 1/122; A01N 1/126; A01N 1/16; A01N 1/165

See application file for complete search history.

(56) References Cited

U.S. PATENT DOCUMENTS

| | | | | |
|---|---|---|---|---|
| 6,390,995 | B1 * | 5/2002 | Ogden | A61B 17/2256 601/2 |
| 7,255,680 | B1 * | 8/2007 | Gharib | A61M 5/16859 604/67 |
| 7,316,922 | B2 | 1/2008 | Streeter | |
| 7,507,213 | B2 * | 3/2009 | Schultheiss | A61H 23/008 601/4 |
| 7,883,482 | B2 * | 2/2011 | Schultheiss | A61H 23/0245 601/4 |
| 7,951,590 | B2 | 5/2011 | Gen | |
| 8,162,859 | B2 | 4/2012 | Schultheiss et al. | |
| 8,263,005 | B2 * | 9/2012 | Laugharn, Jr. | B01L 3/50273 366/127 |
| 8,343,420 | B2 * | 1/2013 | Cioanta | A61L 2/02 422/1 |
| 8,420,381 | B2 * | 4/2013 | Owen | A01N 1/143 435/284.1 |
| 8,900,804 | B2 | 12/2014 | Kamlot et al. | |
| 10,751,246 | B2 * | 8/2020 | Kaila | A61N 7/00 |
| 11,857,813 | B2 * | 1/2024 | Wang | A61N 7/02 |
| 2020/0368377 | A1 * | 11/2020 | Warlick | A61N 7/00 |
| 2021/0322664 | A1 * | 10/2021 | Warlick | A61M 1/3678 |
| 2022/0007638 | A1 * | 1/2022 | Judson | C12M 45/22 |

* cited by examiner

*Primary Examiner* — Fereydoun G Sajjadi
*Assistant Examiner* — Joel D Levin
(74) *Attorney, Agent, or Firm* — Novel IP

(57) ABSTRACT

A method of treating a harvested organ or tissue for preservation for implantation into a patient has the steps of, harvesting an organ or tissue from a donor; placing the harvested organ or tissue into a container; filling the container with a fluid for preservation; sealing the container once filled; directing one or more sound wave treatments into the container to destroy bacteria or molds or fungi or virus and to stimulate the organ or tissue; and storing the container at a hypothermic temperature of about 4 degrees C. for storage prior to implantation.

19 Claims, 9 Drawing Sheets

METHOD AND DEVICE TO PRESERVE ORGANS AND TISSUE FOR TRANSPLANTATION

FIELD OF THE INVENTION

The present invention relates to the use of sound waves, more particularly acoustic shock waves to preserve organs and tissue for transplantation by reducing inflammation in organs and tissue preserved in a liquid in a container extending the available time to implantation while eradicating bacteria, molds, fungi and viruses to prevent infections.

BACKGROUND OF THE INVENTION

Almost all living creatures including plants are formed of cellular tissues. In virtually every living being these cellular communities form an outer protective barrier of tissues. In mammals this protective barrier is commonly referred to as skin. Similarly, in vegetables and plants the outer shell is really a protective barrier of skin or a peel that grows as the vegetable or fruit matures providing a shield from intrusions to the underlying and generally more vulnerable inner tissue. For example, in citrus fruits the juicy high liquid content of these tissues would be impossible to mature without the protective outer peel.

Accordingly, the use of such natural shields or barriers to protect more vulnerable cells or tissue is the norm.

It is therefore of little surprise that on the molecular level bacteria whether aerobic or anaerobic have generally been known to exhibit an outer protective cellular membrane similar to a skin and any treatment to destroy such a bacteria typically required weakening or penetrating this outer membrane. Once penetration occurred the viability of the organism was diminished resulting in a cessation of viability.

Bacteria while being a relatively lower order entity has nonetheless a very strong and evolutionary desire to survive and thus is one of the more adaptive organisms found on earth. Mutant strains of bacteria are commonly feared because of their huge capacity to adapt to threats particularly those involving the use of microbial disinfectants and antibiotics used to fight disease.

Microorganisms grow through a form of cellular division. Blood agar cultures are used to grow colonies of bacteria. The cluster starts out invisible to the naked eye and within 24 to 48 hours can be a large colony of millions of bacteria. This has always been a well known phenomenon of bacterial growth.

Almost all of the prior art literature on the subject of eliminating or preventing bacterial or viral infections suggests one or more drugs or chemical agents as the solution to this problem.

What is sorely lacking are safe and reliable devices and methods to break down the cellular barrier properties of these complex molds, fungi and microbial or viral infections to reduce their resistance to disinfectants and antibiotics.

It is therefore an object of the present invention to provide such a method to reduce or eradicate infections not only on surfaces, but within tissues and organs. One critical area of concern is in the field of organ and tissue transplants. These organs such as the heart, liver, pancreas, kidney and tissue like skin are often harvested from recently deceased persons. These cadavers are subject to surgical procedures to remove the organ or tissue in a clean and aseptic procedure and these harvested materials are then preserved in a fluid and stored at refrigerated or reduced temperatures to maintain tissue viability and reduce microbial or viral contamination. In an ideal practice, the harvested organs are sent to waiting recipient patients as quickly as possible. In practice, however, the timing may take longer and therefore the organ and tissue must be safeguarded against deterioration.

For organ donors, the surgeons drain the donor's organs of blood, refill them with a cold preservation solution, and remove the organs. The organs are then transported to the recipients for the transplantation procedure. Just prior to being removed from the donor, the organs are flushed free of blood with a cold preservation solution. The organs are then placed in sterile containers, packaged in ice, and transported to the recipient's transplant center. A common practice to keep an organ in good condition involves some variation of using ice, thus cooling the organ to slow metabolism and minimize cell death. As an example, thoracic organs like the heart and lungs, can remain viable for transplant after being outside of the body for four to six hours, while the liver can function for up to 12 hours and kidneys up to 36 hours. In the case of heart transplants, the goal is to perform the transplantation within a few hours. This time constraint is difficult to achieve and as a result the harvested organ may be lost.

To overcome this, some devices and preservation fluids have been proposed.

In U.S. Pat. No. 7,316,922 B2, entitled, "Method for preserving organs for transplant", methods and apparatus for preserving tissue such as harvested organs for transplant are described. A preferred method includes delivering to a harvested organ an effective amount of electromagnetic energy, the electromagnetic energy having a wavelength in the visible to near-infrared wavelength range, wherein delivering the effective amount of electromagnetic energy includes selecting a predetermined power density (mW/cm<2>) of electromagnetic energy to deliver to the organ while in hypothermic or normothermic storage. A preferred apparatus includes a container having a cooling chamber to receive the harvested organ and at least one light source mounted on the container to illuminate the interior cooling chamber, said light source emitting light which produces a biostimulative effect on tissue placed in the cooling chamber thereby preventing or retarding damage to the tissue during storage or transport.

In U.S. Pat. No. 8,900,804 B2, entitled "Methods and solutions for tissue preservation" compositions and methods particularly useful in the medical arts are described. The compositions and methods may be used in connection with the preservation of a portion of a mammal, for example, tissues, organs, appendages, limbs, extremities, stem cells, myocytes, bone marrow, skeletal muscle as well as an array of other medical procedures, such as cardiac surgery, transplantation and/or preservation. In various embodiments, the inventive composition may be hyperoxygenated and be formulated to resemble the biochemistries of natural intracellular fluids. The inventive composition includes active ingredients to reduce ischemic, hypothermic and reperfusion injury during transplantation, thereby resulting in improved post-transplant graft function and quality, when used in connection with organ transplantation and storage procedures, for example cardiac transplantation. There is a need in the art for an improved cardiac transplantation solution. In particular, there is a need for a solution that enables the prolonged storage of an organ, such as a heart, for transplantation. By prolonging the tolerable ischemia time of an organ graft, the geographic region from which a donor organ can transported before the viability of the donor organ for transplantation is compromised may be markedly expanded. This, in turn, may improve organ transplantation quality and increase the number of potential donors. The method is to perfuse organs during the process of harvesting the organ and/or transplanting the organ. In various embodiments the inventive composition may include a hyperoxygenated solution to preserve the tissues, organs, appendages, limbs, extremities, stem cells, myocytes, bone marrow and skeletal muscle. Further embodiments of the inventive composition may include active ingredients to reduce ischemic, hypothermic and reperfusion injuring during transplantation, thus resulting in improved post-transplant graft function and quality.

This is just one of many fluids claiming better storage of organs to be transplanted. All of which can benefit from the present invention described hereinafter.

It is a further objective to enhance the use of medications to better attack and destroy the infections without losing effectiveness due to mutations of the disease becoming resistant to the medications like antibiotics.

SUMMARY OF THE INVENTION

A method of treating a harvested organ or tissue for preservation for implantation into a patient has the steps of, harvesting an organ or tissue from a donor; placing the harvested organ or tissue into a container; filling the container with a fluid for preservation; sealing the container once filled; directing one or more sound wave treatments into the container to destroy bacteria or molds or fungi or virus and to stimulate the organ or tissue; and storing the container at a hypothermic temperature of about 4 degrees C. for storage prior to implantation.

In a second embodiment, the method of treating an organ or tissue for transplantation with one or more infections of a microbial or viral source, the infections causing at least localized inflammation, the method has the steps of, harvesting an organ or tissue from a donor; locating a region or location of the infection; activating a pressure pulse or acoustic shock wave generating source; and emitting pressure pulses or acoustic shock waves and directing the pressure pulses or acoustic shock waves to impinge the inflammation directly or by indirectly impinging the organ or tissue to destroy, fracture, fragment or otherwise open the microbial or viral source to eradicate the source and reduce the inflammation; placing the harvested organ or tissue into a container; filling the container with a fluid for preservation; sealing the container once filled; directing one or more sound wave treatments into the container to destroy bacteria or molds or fungi or virus and to stimulate the organ or tissue; and storing the container at a hypothermic temperature of about 4 degrees C. for storage prior to implantation. The method further has the step of administering one or more drugs, antibiotics or other medication to the organ or tissue. The method of treatment further has the step of subjecting a tissue or organ to a surgical procedure to remove some or all of an infection growth.

In the present invention embodiments, the container is configured to transmit sound waves through the container to the preservation fluid and the organ or tissue contained therein. The container can be a flexible bag. The step of directing the one or more sound wave treatments can include placing an acoustic shock wave or pressure pulse emitting applicator against an external surface of the container. Prior to sealing the container, a vacuum can be generated, or the fluid overfilled to remove any residual air. 6. The container can be a flexible bag and after sealing, secondarily sealing a perimeter of the bag to tension the bag and create a positive pressure inside the bag.

The sound wave treatments cause an improved blood supply, a disruption of cellular membranes and a cellular communication causing the cells of the organ or tissue to identify and attack the bacteria or mold or fungi or virus and further causes recruiting or stimulating an increase in antimicrobial peptides.

The method of further has the step of administering medications into the container including, but not limited to anti-viral medications, antibiotics, anti-fungal medications or anti-mold medications, wherein the sound wave treatment extends the useful life of the medications. The sound wave treatments increase the permeability of the organ or tissue cell membranes allowing an increase in releasing antimicrobial peptides and inflow of the medications into the cells while increasing the fluid and medications toward the bacteria or mold or fungi or virus. The sound wave treatment is provided either prior to, during or after administering medications or any combination thereof. An infection's resistance to medications is reduced by the sound wave treatments. The fluid preservative and medication's effectiveness against the infection is enhanced by the sound wave treatments. The dosages or strength of the medications can be reduced when used in combination with the sound wave treatments.

The sound waves can be acoustic shock waves or pressure pulses. The acoustic shock waves are focused or non-focused, convergent, divergent, planar or nearly planar, radial or spherical, shaped or otherwise reflected. The sound wave treatments are emitted by a generator. The generator is one of a radial, a spherical, a ballistic, a linear, a piezoelectric, or an electrohydraulic generator. The sound wave treatments can be administered with or without cavitation. The sound wave treatments can be administered with or without some cellular destruction and with or without a sensation of pain.

The emitted pressure pulses or acoustic shock waves can be convergent having one or more geometric focal volumes of points at a distance of at least X from the generator or source, the method further comprising positioning the organ at a distance at or less than the distance X from the source.

Definitions

"aerobic" living, active, or occurring only in the presence of oxygen.

"anaerobic" living, active, or occurring in the absence of free oxygen.

"apoptosis" is the biological process of controlled, programmed cell death, by means of which cells die by a process of condensation without the release of cell contents into the surrounding milieu.

A "curved emitter" is an emitter having a curved reflecting (or focusing) or emitting surface and includes, but is not limited to, emitters having ellipsoidal, parabolic, quasi parabolic (general paraboloid) or spherical reflector/reflecting or emitting elements. Curved emitters having a curved reflecting or focusing element generally produce waves having focused wave fronts, while curved emitters having a curved emitting surfaces generally produce wave having divergent wave fronts.

"cytoplasm" The part of a cell that contains the CYTOSOL and small structures excluding the CELL NUCLEUS; MITOCHONDRIA; and large VACUOLES.

"Divergent waves" in the context of the present invention are all waves which are not focused and are not plane or nearly plane. Divergent waves also include waves which only seem to have a focus or source from which the waves are transmitted. The wave fronts of divergent waves have divergent characteristics. Divergent waves can be created in many different ways, for example: A focused wave will become divergent once it has passed through the focal point. Spherical waves are also included in this definition of divergent waves and have wave fronts with divergent characteristics.

"endocarditis" inflammation of the lining of the heart and its valves.

"extracorporeal" occurring or based outside the living body.

A "generalized paraboloid" according to the present invention is also a three-dimensional bowl. In two dimensions (in Cartesian coordinates, x and y) the formula $y^n=2px$ [with n being≠2, but being greater than about 1.2 and smaller than 2, or greater than 2 but smaller than about 2.8]. In a generalized paraboloid, the characteristics of the wave fronts created by electrodes located within the generalized paraboloid may be corrected by the selection of (p (−z, +z)), with z being a measure for the burn down of an electrode, and n, so that phenomena including, but not limited to, burn down of the tip of an electrode (−z, +z) and/or disturbances caused by diffraction at the aperture of the paraboloid are compensated for.

"lactate dehydrogenase (LDH)" A tetrameric enzyme that, along with the coenzyme NAD+, catalyzes the interconversion of lactate and pyruvate. In vertebrates, genes for three different subunits (LDH-A, LDH-B and LDH-C) exist.

"mitochondria" Semiautonomous, self-reproducing organelles that occur in the cytoplasm of all cells of most, but not all, eukaryotes. Each mitochondrion is surrounded by a double limiting membrane. The inner membrane is highly invaginated, and its projections are called cristae. Mitochondria are the sites of the reactions of oxidative phosphorylation, which result in the formation of ATP. They contain distinctive RIBOSOMES, transfer RNAs (RNA, TRANSFER); AMINO ACYL T RNA SYNTHETASES; and elongation and termination factors. Mitochondria depend upon genes within the nucleus of the cells in which they reside for many essential messenger RNAs (RNA, MESSENGER). Mitochondria are believed to have arisen from aerobic bacteria that established a symbiotic relationship with primitive protoeukaryotes.

"necrosis" A pathological process caused by the progressive degradative action of enzymes that is generally associated with severe cellular trauma. It is characterized by mitochondrial swelling, nuclear flocculation, uncontrolled cell lysis, and ultimately CELL DEATH.

A "paraboloid" according to the present invention is a three-dimensional reflecting bowl. In two dimensions (in Cartesian coordinates, x and y) the formula $y^2=2px$, wherein p/2 is the distance of the focal point of the paraboloid from its apex, defines the paraboloid. Rotation of the two-dimensional figure defined by this formula around its longitudinal axis generates a de facto paraboloid.

"phagocytosis" The engulfing of microorganisms, other cells, and foreign particles by phagocytic cells.

"Plane waves" are sometimes also called flat or even waves. Their wave fronts have plane characteristics (also called even or parallel characteristics). The amplitude in a wave front is constant and the "curvature" is flat (that is why these waves are sometimes called flat waves). Plane waves do not have a focus to which their fronts move (focused) or from which the fronts are emitted (divergent). "Nearly plane waves" also do not have a focus to which their fronts move (focused) or from which the fronts are emitted (divergent). The amplitude of their wave fronts (having "nearly plane" characteristics) is approximating the constancy of plain waves. "Nearly plane" waves can be emitted by generators having pressure pulse/shock wave generating elements with flat emitters or curved emitters. Curved emitters may comprise a generalized paraboloid that allows waves having nearly plane characteristics to be emitted.

A "pressure pulse" according to the present invention is an acoustic pulse which includes several cycles of positive and negative pressure. The amplitude of the positive part of such a cycle should be above about 0.1 MPa and its time duration is from below a microsecond to about a second. Rise times of the positive part of the first pressure cycle may be in the range of nano-seconds (ns) up to some milli-seconds (ms). Very fast pressure pulses are called shock waves. Shock waves used in medical applications do have amplitudes above 0.1 MPa and rise times of the amplitude can be below 1000 ns, preferably at or below 100 ns. The duration of a shock wave is typically below 1-3 micro-seconds (μs) for the positive part of a cycle and typically above some micro-seconds for the negative part of a cycle.

"Shock Wave": As used herein is defined by Camilo Perez, Hong Chen, and Thomas J. Matula; Center for Industrial and Medical Ultrasound, Applied Physics Laboratory, University of Washington, 1013 NE 40th Street, Seattle, Washington 98105; Maria Karzova and Vera A. Khokhlovab; Department of Acoustics, Faculty of Physics, Moscow State University, Moscow 119991, Russia; (Received 9 Oct. 2012; revised 16 Apr. 2013; accepted 1 May 2013) in their publication, "Acoustic field characterization of the Duolith: Measurements and modeling of a clinical shock wave therapy device"; incorporated by reference herein in its entirety.

Wave energy or energy flux density: the measurement of energy flux density is defined as the energy directed toward the target or region being treated. This is not energy at the gap between electrodes, but rather the energy transmitted toward the patient's tissue through the skin. Important to distinguish that the energy levels discussed pertain to the energy delivered to the targeted tissues and not at the discharge point between the electrode tips. Spherical waves have a huge amount of energy produced between the tips to deliver adequate energy to the targeted tissues since they do not have the advantage of a lens.

Waves/wave fronts described as being "focused" or "having focusing characteristics" means in the context of the present invention that the respective waves or wave fronts are traveling and increase their amplitude in direction of the focal point. Per definition the energy of the wave will be at a maximum in the focal point or, if there is a focal shift in this point, the energy is at a maximum near the geometrical focal point. Both the maximum energy and the maximal pressure amplitude may be used to define the focal point.

BRIEF DESCRIPTION OF THE DRAWINGS

The invention will be described by way of example and with reference to the accompanying drawings in which.

DETAILED DESCRIPTION OF THE INVENTION

Figure 1:
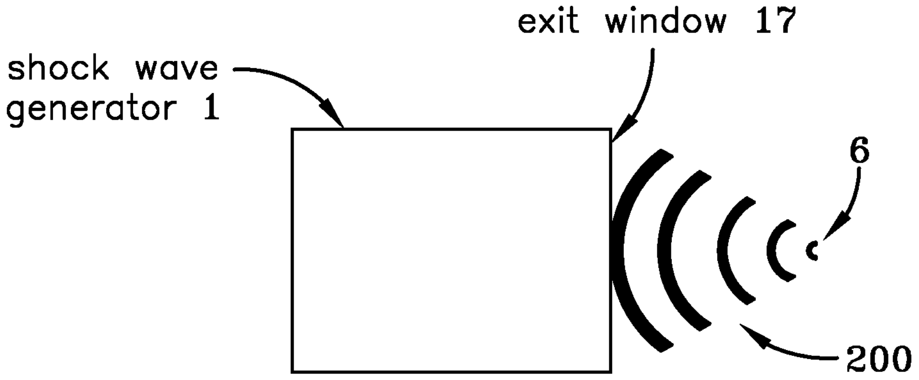
FIG. 1 is a simplified depiction of a pressure pulse/shock wave (PP/SW) generator with focusing wave characteristics.

In the extracorporeal shock wave or pressure pulse method of treating an organ or tissue, the administered shock waves or pressure pulses are directed to a treatment location or target site on the organ or tissue. In this invention, the term target site refers to either a location near the source of the infection, typically on a surface of the organ or tissue. As used herein, "near" recognizes that the emitted shock waves or pressure pulses are transmitted through the organ or tissue, preferably at or in close proximity to the treatment location or site.

The sound wave treatment can be applied directly to harvested organs or tissue. The fluids being preservative solutions that enhance duration times between harvesting and implantation. These fluids ideally protect the organ or tissue, but also suppress bacterial, viral and other contaminants that can adversely increase the risk of the implanted organ or tissue being rejected.

The organ or tissue, after being harvested, is placed in a convenient orientation to permit the source of the emitted waves to most directly send the waves to the target site to initiate shock wave stimulation of the target area. Assuming the target area is within a projected area of the wave transmission, a single transmission dosage of wave energy may be used. The transmission dosage can be from a few seconds to 20 minutes or more dependent on the condition. Preferably the waves are generated from an unfocused or focused source. The unfocused waves can be divergent or near planar and having a low-pressure amplitude and density in the range of 0.00001 $mJ/mm^2$ to 1.0 $mJ/mm^2$ or less, most typically below 0.2 $mJ/mm^2$. These are typically generated by spherical or radial wave generators, ballistic or electrohydraulic wave or piezoelectric shock wave generators. The focused source can use a focused beam of waves or can optionally use a diffusing lens or have a far-sight focus to minimize if not eliminate having the localized focus zone within the organ or tissue. Preferably the focused shock waves are used at a similarly effective low energy transmission or alternatively can be at higher energy but wherein the organ or tissue target site is disposed pre-convergence inward of the geometric focal point of the emitted wave transmission. Understanding the higher the energy used, the more sensation of bruising the organ or tissue. In these cases, cavitation can and often does occur as well as bruising and come cell damage. This is preferably and easily avoidable.

These shock wave energy transmissions are effective in stimulating a cellular response and in some cases, such as unfocused low energy, and even low energy focused emissions can be accomplished without creating the localized hemorrhaging caused by rupturing cavitation bubbles in the organ or tissue of the target site. This effectively ensures the harvested organ or tissue does not have to experience the sensation of cellular damage so common in the higher energy focused wave forms having a focal point at or within the targeted treatment site. Higher energy acoustic shock waves or pressure pulses including focused waves can be used, but with care to avoid such damage.

The target site may be such that the organ or tissue or the generating source must be reoriented relative to the site and a second, third or more treatment dosage can be administered. At a low energy, the common problem of localized hemorrhaging is reduced making it more practical to administer multiple dosages of waves from various orientations to further optimize the treatment and cellular stimulation of the target site. Alternatively, focused high energy multiple treatments can be equally effective, but with some risk to organ or tissue bruising. The use of low energy focused or unfocused waves at the target site enables multiple sequential treatments. Alternatively, the wave source generators may be deployed in an array wherein the subject organ or tissue is effectively enveloped or surrounded by a plurality of low energy wave source generators which can be simultaneously bombarding the target site from multiple directions. Such arrays include linear type devices.

The goal in such treatments is to provide 100 to 3000 acoustic shock waves or pressure pulses. Typically, at a voltage of 14 kV to 28 kV across a spark gap generator in a single treatment preferably or one or more adjuvant treatments by targeting the site directly by impinging the emitted waves toward the infection or indirectly on the desired harvested organ or tissue.

The present method, in many cases, does not rely on precise site location per se. The physician's general understanding of the anatomy of the organ or tissue should be sufficient to locate a desirable direct path or to the target site to attack the infection be treated. The treated area can withstand a far greater number of shock waves based on the selected energy level being emitted. For example, at very low energy levels the stimulation exposure can be provided over prolonged periods as much as 20 minutes if so desired. At higher energy levels the treatment duration can be shortened to less than a minute, less than a second if so desired. The selected treatment dosage can include the avoidance or minimization of cell hemorrhaging and other kinds of damage to the cells or tissue while still providing a stimulating cellular release activation of upregulation of the antimicrobial peptide LL37, a protein that can bind with RNA to destroy the infection, and also vascular endothelial growth factor (VEGF) and other growth factors and can also be used to modulate and regulate hormonal secretions from a specific targeted gland by emitting waves to a desired direct path.

A key advantage of the present inventive methodology is that it is complimentary to conventional medical procedures to harvest organs or tissue. In the case of any other procedure, the area of the harvested organ or tissue can be post operatively bombarded with sound waves to stimulate cellular release of healing agents and growth factors. Most preferably one ESWT treatment is used with an intervening dwell time for cellular relaxation prior to secondary and tertiary treatments.

The underlying principle of these sound wave therapy methods is to stimulate the harvested organ or tissue. This is accomplished by deploying shock waves to stimulate strong cells in the tissue to activate a variety of responses, more particularly those that reduce inflammation and stop the infection. The sound waves including acoustic shock waves or pressure pulses transmit or trigger what appears to be a cellular communication throughout the entire anatomical structure of the harvested organ or tissue, this activates a generalized cellular response at the treatment or target site, in particular, but more interestingly a systemic response in areas more removed from the wave form pattern. This is believed to be one of the reasons molecular stimulation can be conducted at threshold energies heretofore believed to be well below those commonly accepted as required. Accordingly, not only can the energy intensity be reduced but also the number of applied shock wave impulses can be lowered from several thousand to as few as one or more pulses and still yield a beneficial stimulating response if desired.

The biological model motivated the design of sources with low pressure amplitudes and energy densities. First: spherical waves generated between two tips of an electrode; and second: nearly even waves generated by generated by generalized parabolic reflectors. Third: divergent shock front characteristics are generated by an ellipsoid. Unfocused sources are preferably designed for extended two dimensional areas/volumes like skin. The unfocused sources can provide a divergent wave pattern or a nearly planar wave pattern and can be used in isolation or in combination with focused wave patterns yielding to an improved therapeutic treatment capability that is noninvasive with few if any disadvantageous contraindications. Alternatively, a focused wave emitting treatment may be used wherein the focal point extends to the target site. In any event, the beam of acoustic waves transmitted needs to project in a large enough zone or area to stimulate or modulate the cells near the infection.

In one embodiment, the method of treatment has the steps of, generating either focused shock waves or unfocused shock waves, of directing these shock waves to the treatment site; and applying a sufficient number of these shock waves to induce activation of one or more growth factor or antimicrobial peptides like LL37, thereby inducing or accelerating a modulated adjustment to induce the host cells to attack the infection when the treated harvested organ or tissue is implanted.

The shock waves can be of a low peak pressure amplitude and density. Typically, the energy density values range as low as 0.000001 $mJ/mm^2$ and having a high end energy density of below 1.0 $mJ/mm^2$, preferably 0.40 $mJ/mm^2$ or less, more preferably 0.20 $mJ/mm^2$ or less. The peak pressure amplitude of the positive part of the cycle should be above 1.0 and its duration is below 1-3 micro-seconds.

The treatment depth can vary from the surface to the full depth of the harvested organ or tissue and the treatment site can be defined by a much larger treatment area. The above methodology is particularly well suited for surface as well as sub-surface soft tissue treatments in harvested organs or tissue.

An exemplary treatment protocol could have emitted shock waves in a broad range of 0.01 $mJ/mm^2$ to 3.0 $mJ/mm^2$ and 200-2500 pulses per treatment with a treatment schedule of 1-3 treatments being repeated during preservation and storage as a preventative prior to implantation.

The following invention description first provides a detailed explanation of acoustic shock waves or pressure pulses, as illustrated in FIGS. 1-9. As used herein and shown in FIG. 9, an acoustic shock wave is an asymmetric wave with an exceptionally rapid peak rise time and slower return time from the peak amplitude. Historically, these acoustic shock waves or pressure pulses were first used medically to destroy kidney stones. The wave patterns were directed to a focal point at a relatively high energy to blast the concrements into small urinary tract passable fragments.

A whole class of acoustic shock waves or pressure pulses for medical treatments were later discovered that employed low energy acoustic shock waves or pressure pulses. These low energy acoustic shock waves or pressure pulses maintained the asymmetric wave profile, but at much lower energies.

These low energy acoustic shock waves or pressure pulses advantageously could stimulate a substance without requiring a focused beam. The advantage of such an unfocused beam was the acoustic wave could be directed to pass through tissue without causing any cell rupturing which would be evidenced by a lack of a hematoma or bruising. This use of unfocused, low energy acoustic shock waves or pressure pulses provided an ability to treat a large volume of tissue virtually painlessly. Furthermore, the acoustic energy caused a short duration anesthetic sensation that effectively numbs the patient's pain over a period of days with a prolonged reduction in pain thereafter.

The use of low energy acoustic shock waves or pressure pulses that employ a focused beam has been spurred on as a viable alternative to the unfocused low energy shock waves because the focal point being of a small zone of energy has little or a small region of cell damage as the remaining portions of the wave pattern can provide a stimulating effect similar to the unfocused shock waves. Basically, the effect is the same with the users of focused waves achieving the benefits of the unfocused waves, but with a focal point of peak energy in a tiny localised region. So, for purposes of the present invention, the use of "soft waves" those defined by low energy beams will be applicable to both focused and unfocused beams of acoustic shock waves or pressure pulses.

Figure 8:
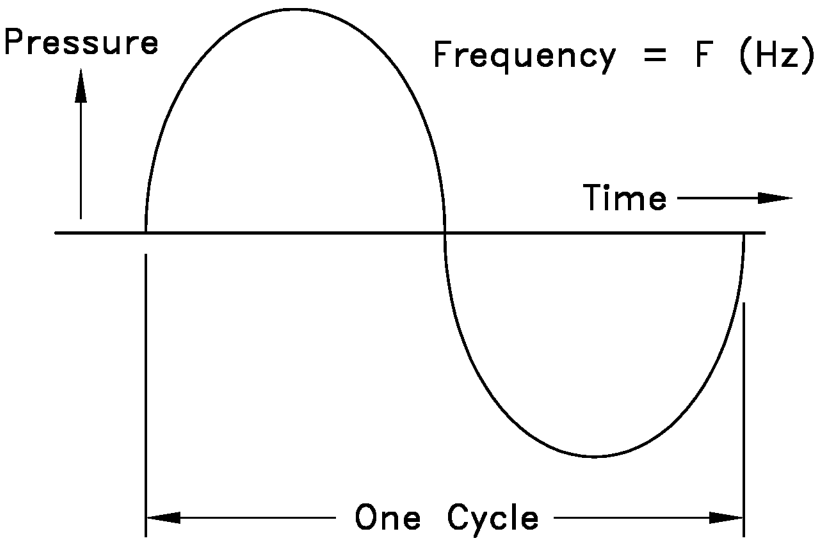
FIG. 8 is a graph showing an exemplary ultrasound wave pattern.
Figure 9:
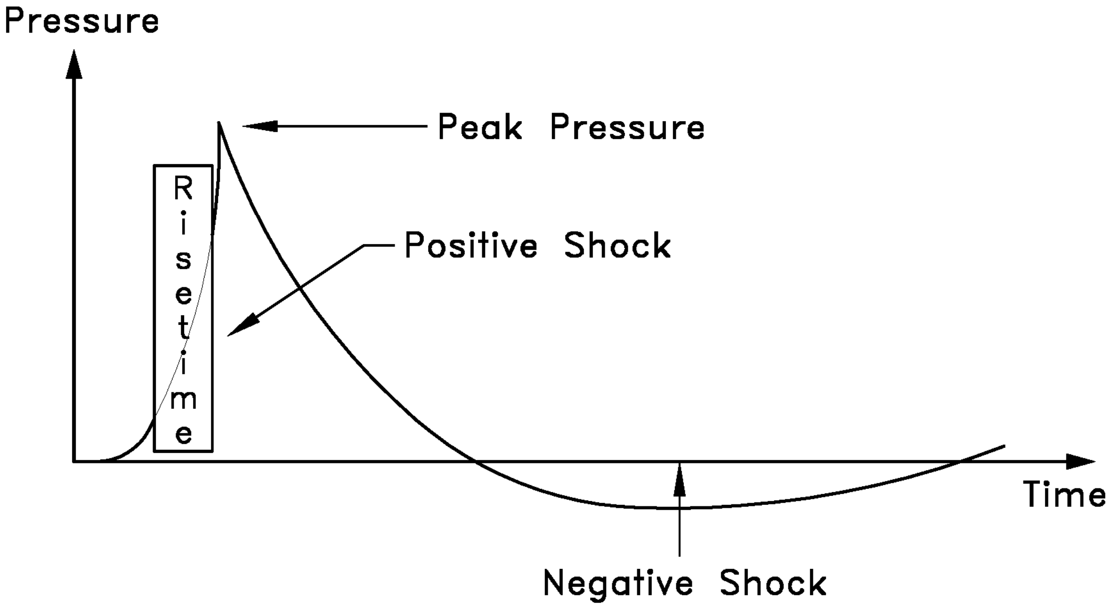
FIG. 9 is a graph showing an exemplary sound wave pattern.

The asymmetric acoustic wave pattern shown in FIG. 9 is contrasted to an ultrasonic wave pattern which is illustrated in FIG. 8. As shown, ultrasound waves are symmetrical having the positive rise time equal to the negative in a sinusoidal wave form. These ultrasound waves generate heat in the tissue and are accordingly believed not suitable for use on harvested organs or tissue.

Figure 2:
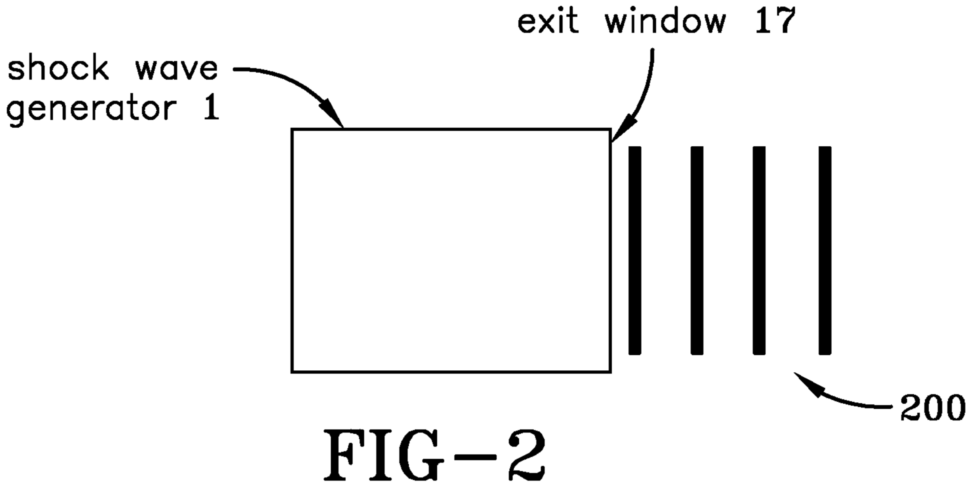
FIG. 2 is a simplified depiction of a pressure pulse/shock wave generator with plane wave characteristics.
Figure 3:
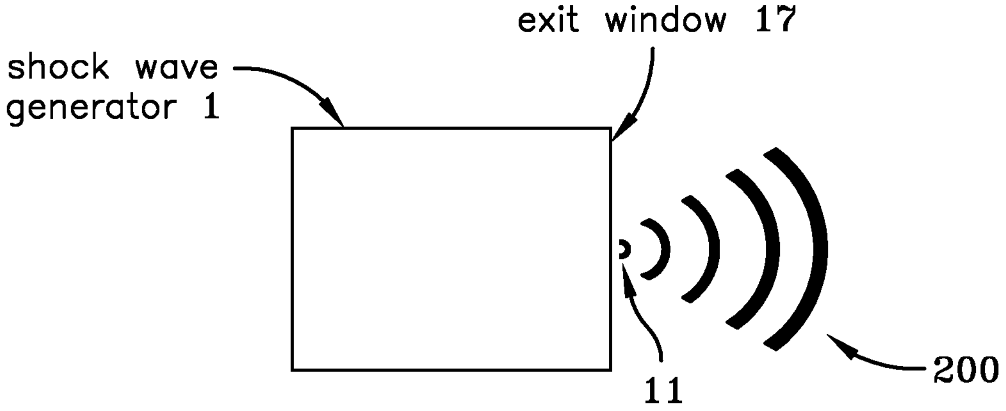
FIG. 3 is a simplified depiction of a pressure pulse/shock wave generator with divergent wave characteristics.

With reference to FIGS. 1-3, a variety of schematic views of acoustic shock waves or pressure pulses are described. The following description of the proper amplitude and pressure pulse intensities of the shock waves 200 are provided below along with a description of how the shock waves actually function and have been taken from the co-pending application of the present inventors and replicated herein as described below. For the purpose of describing the shock waves 200 were used as exemplary and are intended to include all of the wave patterns discussed in the figures as possible treatment patterns.

FIG. 1 is a simplified depiction of a pressure pulse/shock wave (PP/SW) generator, such as a shock wave head, showing focusing characteristics of transmitted acoustic pressure pulses. Numeral 1 indicates the position of a generalized pressure pulse generator, which generates the pressure pulse and, via a focusing element, focuses it outside the housing to treat diseases. The affected infected tissue or organ is generally located in or near the focal point which is located in or near position 6. At position 17 a water cushion or any other kind of exit window for the acoustical energy is located.

FIG. 2 is a simplified depiction of a pressure pulse/shock wave generator, such as a shock wave head, with plane wave characteristics. Numeral 1 indicates the position of a pressure pulse generator according to the present invention, which generates a pressure pulse which is leaving the housing at the position 17, which may be a water cushion or any other kind of exit window. Somewhat even (also referred to herein as "disturbed") wave characteristics can be generated, in case a paraboloid is used as a reflecting element, with a zone source (e.g. electrode) that is located in the focal point of the paraboloid. The waves 200 can be transmitted into harvested organs or tissue via a coupling media such as, e.g., ultrasound gel or oil and their amplitudes will be attenuated with increasing distance from the exit window 17.

FIG. 3 is a simplified depiction of a pressure pulse shock wave generator (shock wave head) with divergent wave characteristics. The divergent wave fronts may be leaving the exit window 17 at zone 11 where the amplitude of the wave front is very high. This zone 17 could be regarded as the source zone for the pressure pulses. In FIG. 1*c* the pressure pulse source may be a zone source infected, that is, the pressure pulse may be generated by an electrical discharge of an electrode under water between electrode tips. However, the pressure pulse may also be generated, for example, by an explosion, referred to as a ballistic pressure pulse. The divergent characteristics of the wave front may be a consequence of the mechanical setup. The source can include radial or spherical wave generators, or linear arrays of wave generators.

This apparatus, in certain embodiments, may be adjusted/modified/or the complete shock wave head or part of it may be exchanged so that the desired and/or optimal acoustic profile such as one having wave fronts with focused, planar, nearly plane, convergent or divergent characteristics can be chosen.

A change of the wave front characteristics may, for example, be achieved by changing the distance of the exit acoustic window relative to the reflector, by changing the reflector geometry, by introducing certain lenses or by removing elements such as lenses that modify the waves produced by a pressure pulse/shock wave generating element. Exemplary pressure pulse/shock wave sources that can, for example, be exchanged for each other to allow an apparatus to generate waves having different wave front characteristics are described in detail below.

In one embodiment, mechanical elements that are exchanged to achieve a change in wave front characteristics include the primary pressure pulse generating element, the focusing element, the reflecting element, the housing and the membrane. In another embodiment, the mechanical elements further include a closed fluid volume within the housing in which the pressure pulse is formed and transmitted through the exit window.

In one embodiment, the apparatus of the present invention is used in combination therapy. Here, the characteristics of waves emitted by the apparatus are switched from, for example, focused to divergent or from divergent with lower energy density to divergent with higher energy density. Thus, effects of a pressure pulse treatment can be optimized by using waves having different characteristics and/or energy densities, respectively.

While the above described universal toolbox of the various types of acoustic shock waves or pressure pulses and types of shock wave generating heads provides versatility, the person skilled in the art will appreciate that apparatuses that produce acoustic shock waves or pressure pulses having, for one example, nearly plane characteristics, are less mechanically demanding and fulfil the requirements of many users.

As the person skilled in the art will also appreciate that embodiments shown in the drawings are independent of the generation principle and thus are valid for not only electro-hydraulic shock wave generation but also for, but not limited to, PP/SW generation based on electromagnetic, piezoceramic and ballistic principles. The pressure pulse generators may, in certain embodiments, be equipped with a water cushion that houses water which defines the path of pressure pulse waves that is, through which those waves are transmitted. In a preferred embodiment, the organ or tissue directly or the fluid filled container holding these harvested organs or tissue is coupled via ultrasound gel or oil to the acoustic exit window (17), which can, for example, be an acoustic transparent membrane, a water cushion, a plastic plate or a metal plate.

In the pressure pulse or shock wave method of treating an infection within a harvested tissue or organ with a risk of exposure to an infection or post-occurrence of such infections requires the harvested tissue or organ to be positioned in a convenient orientation to permit the source of the emitted waves to most directly send the waves to the target site to initiate pressure pulse or shock wave stimulation of the target area with minimal, preferably no obstructing features in the path of the emitting source or lens other than the fluid filled container holding the organ or tissue. Assuming the infection target area or site is within a projected area of the wave transmission, a single transmission dosage of wave energy may be used. The transmission dosage can be from a few seconds to 20 minutes or more dependent on the condition. Preferably the waves are generated from an unfocused or focused source. The unfocused waves can be divergent, planar or near planar and having a low pressure amplitude and density in the range of 0.00001 mJ/mm$^2$ to 1.0 mJ/mm$^2$ or less, most typically below 0.2 mJ/mm$^2$. The focused source preferably can use a diffusing lens or have a far-sight focus to minimize if not eliminate having the localized focus point within the tissue. Preferably the focused shock waves are used at a similarly effective low energy transmission or alternatively can be at higher energy but wherein the tissue target site is disposed pre-convergence inward of the geometric focal point of the emitted wave transmission. In treating some hard to penetrate infections, the pressure pulse more preferably is a high energy target focused wave pattern which can effectively attack the infection outer structure or barrier shield causing fractures or openings to be created to expose the colonies of microorganisms within the infection to the germicidal effects of the pressure pulses or shock waves. This emitted energy destroys the underlying microorganism's cellular membranes. In addition, the fragmentation of the infections outer barrier is then easily germicidally killed out of the harvested material. The surrounding healthy cells in the region treated are activated initiating a defense mechanism response to assist in eradication of any unwanted infection.

These shock wave energy transmissions are effective in stimulating a cellular response and can be accomplished without creating the cavitation bubbles in the tissue of the target site when employed in other than high energy focused transmissions. This effectively ensures the tissue or organ does not have to experience the sensation of hemorrhaging so common in the higher energy focused wave forms having a focal point at or within the targeted treatment site.

The limiting factor in the selected treatment dosage is to provide a stimulating stem cell activation or a cellular release or activation of the LL37 protein and VEGF and other growth factors while simultaneously germicidally attacking the infection barrier and any underlying colony of microorganisms.

The underlying principle of these pressure pulse or shock wave therapy methods is to attack the infection directly and to stimulate the harvested organ or tissue. This is accomplished by deploying shock waves to stimulate strong cells in the surrounding tissue to activate a variety of responses. The acoustic shock waves transmit or trigger what appears to be a cellular communication throughout the entire anatomical structure of the harvested organ or tissue, this activates a generalized cellular response at the treatment site, in particular, but more interestingly a systemic response in areas more removed from the wave form pattern. This is believed to be one of the reasons molecular stimulation can be conducted at threshold energies heretofore believed to be well below those commonly accepted as required. Accordingly, not only can the energy intensity be reduced in some cases, but also the number of applied shock wave impulses can be lowered from several thousand to as few as one or more pulses and still yield a beneficial stimulating response. The key is to provide at least a sufficient amount of energy to weaken the infections protective outer barrier or shield commonly found in biofilms. This weakening can be achieved by any fracture or opening that exposes the underlying colony of microorganisms.

The use of shock waves as described above achieved biological response within the cells and there appears to be a commonality in the fact that otherwise dormant cells within the tissue appear to be activated making the cell membranes more permeable to release anti-microbial peptides and absorb medications to attack infections which leads to the remarkable ability of the harvested organ or tissue to generate new growth or to regenerate weakened vascular networks increasing blood supply when implanted.

In one embodiment, the invention provides for germicidal cleaning of an infection, diseased or infected areas and for wound cleaning generally after exposure to surgical harvesting procedures.

The use of shock wave therapy requires a fundamental understanding of focused and unfocused shock waves, coupled with a more accurate biological or molecular model.

This means the physician can use these antibiotic treatments with far less adverse reactions if he combines the treatments with one or more exposures to acoustic shock waves either before introducing chemical antibiotic agents or shortly thereafter or both. This further means that the patient receiving the harvested organ or tissue has a recovery time that should be greatly reduced because the organ or tissue treated with shock waves will have initiated a healing response that is much more aggressive than heretofore achieved without the cellular stimulation provided by pressure pulse or shock wave treatments. The current use of medications to stimulate such cellular activity is limited to absorption through the bloodstream via the blood vessels. Acoustic shock waves stimulate all the cells in the region treated activating an almost immediate cellular release of infection fighting and healing agents. Furthermore, as the use of other wise conflicting chemicals is avoided, adverse side effects can be limited to those medicaments used to destroy the infectious cells. In other words, the present invention is far more complimentary to such antibiotic treatments in that the stimulation of otherwise healthy cells will greatly limit the adverse and irreversible effects on the surrounding non-infected tissues and organs.

A further benefit of the use of acoustic shock waves is there are no known adverse indications when combined with the use of other medications or drugs. In fact, the activation of the cells exposed to shock wave treatments only enhances cellular absorption of such medication making these drugs faster acting than when compared to non stimulated cells. As a result, it is envisioned that the use of one or more medicaments prior to, during or after subjecting the patient to acoustic shock waves will be complimentary to the treatment or pre-conditioning treatment for infection exposures. It is further appreciated that certain drug therapies can be altered or modified to lower risk or adverse side effects when combined with a treatment involving acoustic shock waves as described above.

Figure 4:
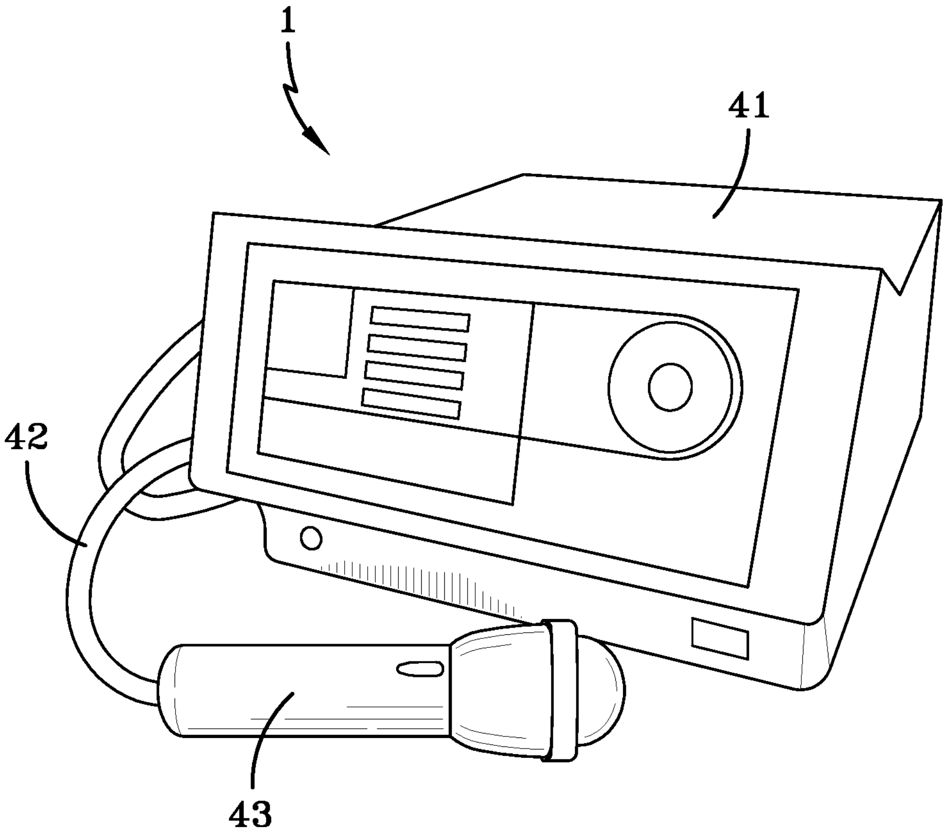
FIG. 4 is a perspective view of a shock wave generator device.

FIG. 4 shows an exemplary shock wave device generator or source 1 with a control and power supply 41 connected to a hand-held applicator shock wave head 43 via a flexible hose 42 with fluid conduits. The illustrated shock wave applicator 43 has a flexible membrane at an end of the applicator 43 which transmits the acoustic waves when coupled to the external surface of the harvested organ or tissue or the fluid filled container holding this harvested material by using a fluid or acoustic gel. As shown, this type of applicator 43 has a hydraulic spark generator using either focused or unfocused shock waves, preferably in a low energy level, less than the range of 0.01 $mJ/mm^2$ to 0.3 $mJ/mm^2$. The flexible hose 42 is connected to a fluid supply that fills the applicator 43 and expands the flexible membrane when filled. Alternatively, a ballistic, piezoelectric or spherical acoustic shock wave device can be used to generate the desired waves.

In a preferred embodiment of the present invention, the container 50 is a flexible bag which is filled with the harvested organ or tissue and a preservative fluid. Once the flexible container 50 is filled, it is sealed while insuring all the residual air is displaced prior to sealing the bag 50. Thereafter, in a preferred embodiment, the filled sealed bag 50 has been tensioned by sealing a perimeter 52 around the filled bag 50. The secondary sealing of the bag 50 actually tensions the bag and provides a slight positive pressure inside the bag 50. This positive pressure helps drive the fluid into the harvested organ or tissue 100, as shown in FIG. 5B, the heart 100. Thereafter the shock wave applicator 43 is acoustically coupled to the bag 50 for transmission of the shock waves 200. The bag 50 can be turned to have the applicator 43 transmit to the opposite side of the bag 50. In this preferred embodiment, the harvested organ or tissue is protected by this tensioning of the flexible container 50. The organ or tissue is shielded from bruising by having the container 50 effectively pressured by the perimeter 52 tensioning the bag or container 50.

Figure 5A:
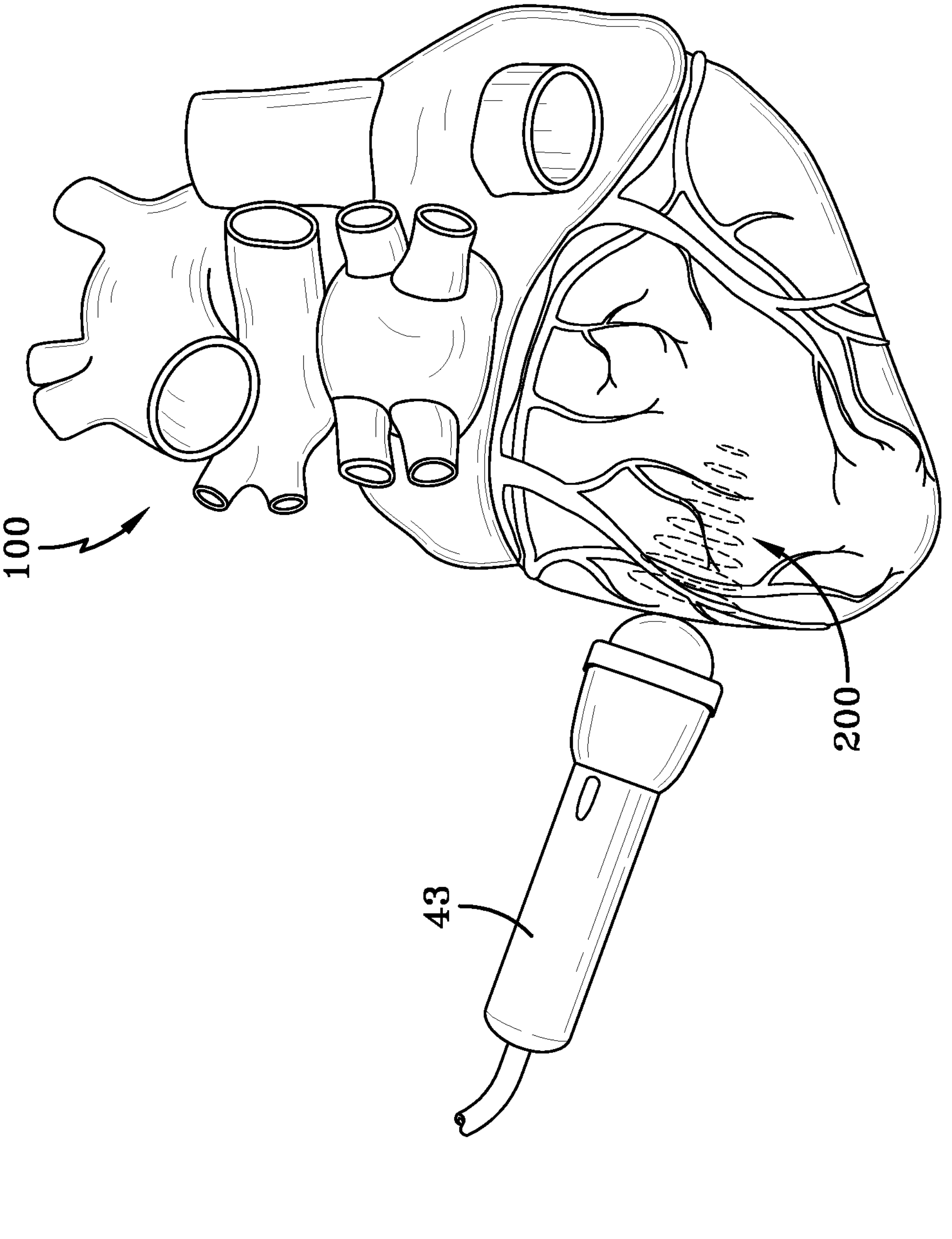
FIG. 5A is a perspective view of a heart being treated with a shock wave or pressure pulse applicator.
Figure 5B:
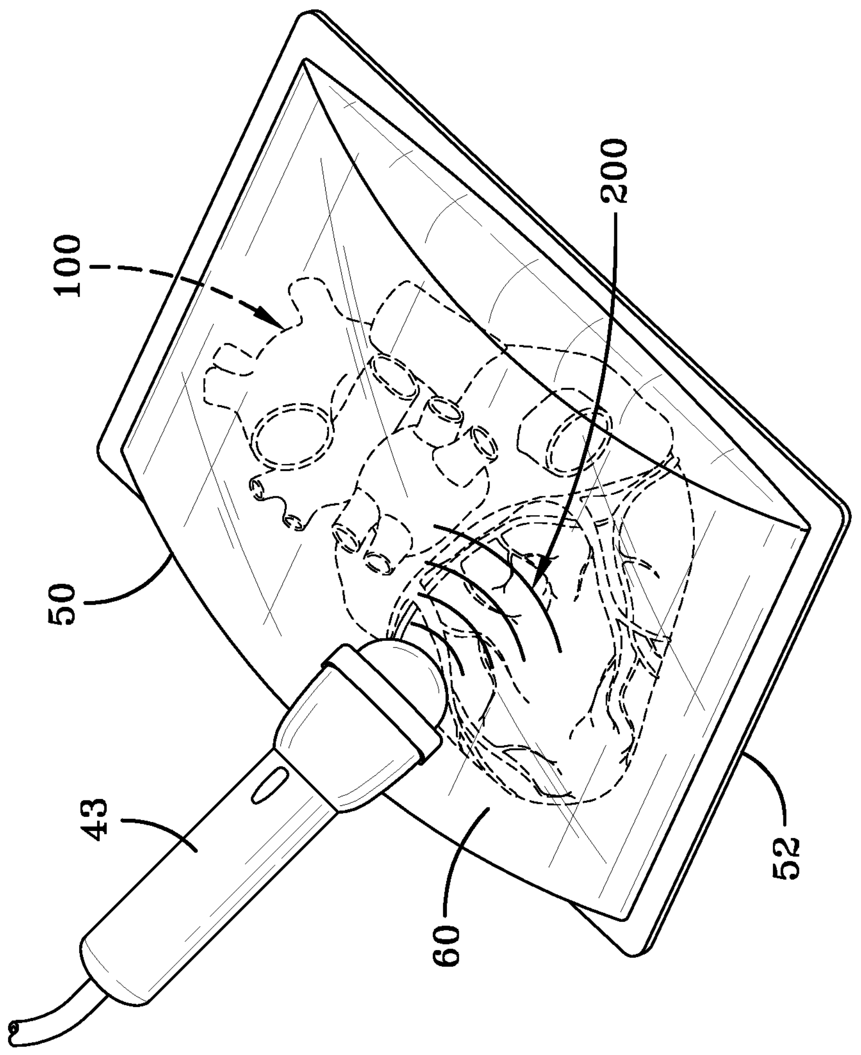
FIG. 5B is a perspective view of a heart in a container being treated with a shock wave or pressure pulse applicator.

With reference to FIGS. 5A and 5B the organ 100 shown is a heart. In FIG. 5A a frontal view of the heart is shown wherein the frontal region is being bombarded with exemplary shock waves 200 wherein the shockwave applicator 43 is shown unobstructed to the tissue of the heart. The shockwave applicator 43 is connected through the cable 1 back to a control and power supply 41, as shown in FIG. 4. As illustrated the exemplary shock waves 200 emanate through the tissue of the heart 100 providing a beneficial regenerating and revascularization capability that heretofore was unachieved. The beneficial aspects of the present methodology are that the heart 100 as shown fully exposed in FIG. 5A is fully exposed such that the shock wave head 43 can be inserted therein and directed to contact or be in near contact to the heart tissue is such a way that the admitted exemplary shock waves 200 can most directly and in the most unobstructed way be transmitted to the heart. FIG. 5B shows the heart 100 being treated in a container 50 filled with preservative fluid 60.

Figure 6A:
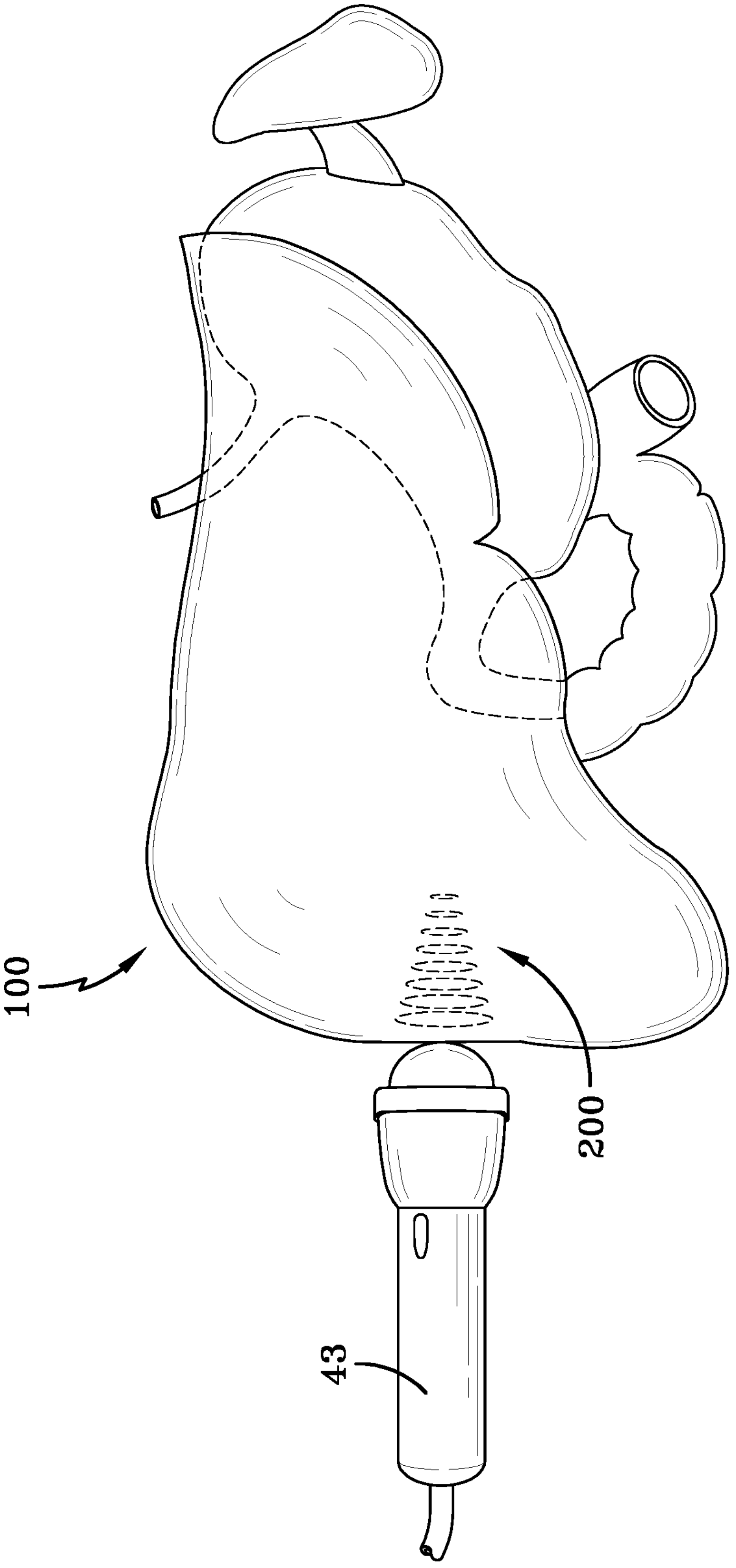
FIG. 6A is a perspective view of a liver being treated with a shock wave or pressure pulse applicator.
Figure 6B:
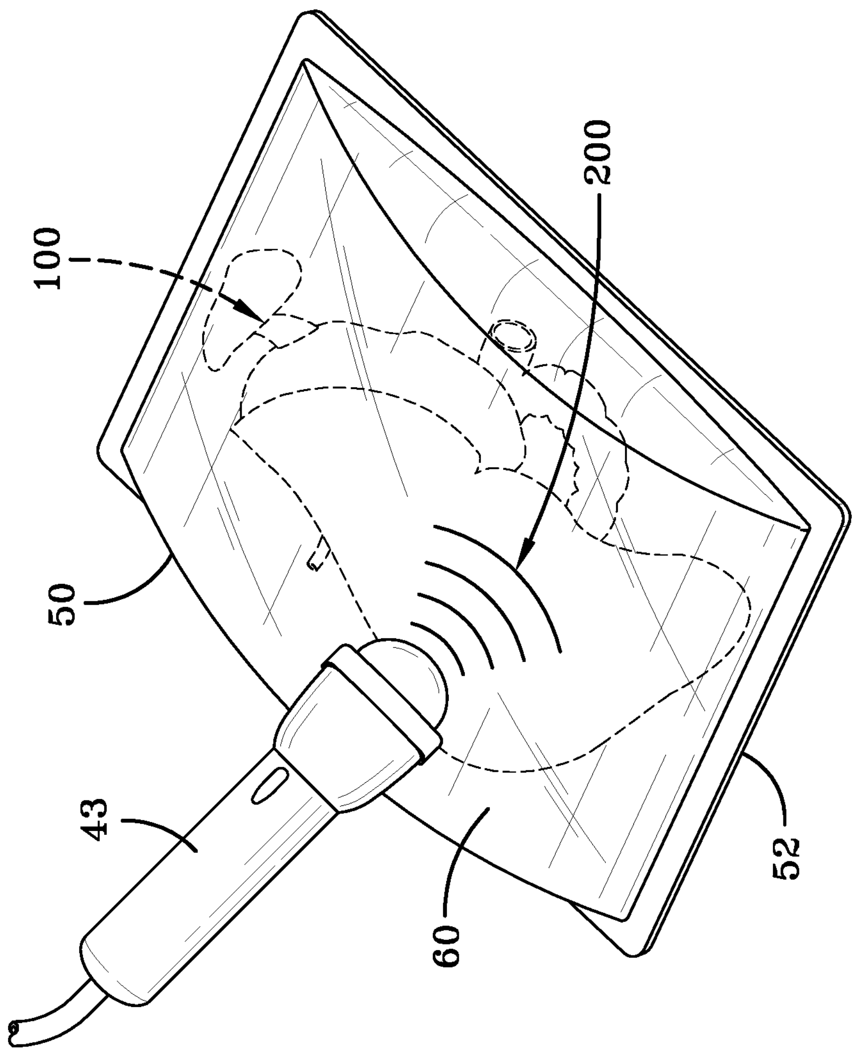
FIG. 6B is a perspective view of a liver in a container being treated with a shock wave or pressure pulse applicator.

With reference to FIG. 6A, the organ 100 is a liver. As shown, in addition to the liver 100, the stomach, spleen and duodenum are also shown. The shock wave applicator 43 is in contact with the liver 100 and is providing a therapeutic shock wave treatment as illustrated wherein the exemplary shock waves 200 are being transmitted through the tissue of the liver. It is believed that the use of such exemplary shock waves 200 can help in enhancing liver regeneration particularly those that have been degenerative and in conditions that might be prone to failure. Again, the harvested liver 100 is shown fully exposed such that the shock wave applicator 43 can provide a direct unobstructed path to deliver shock-wave treatments to this organ as well. FIG. 6B shows the liver 100 being treated in a container 50 filled with preservative fluid 60. The container 50 is the same as described above and provides the added protection to the harvested liver 100.

Figure 7A:
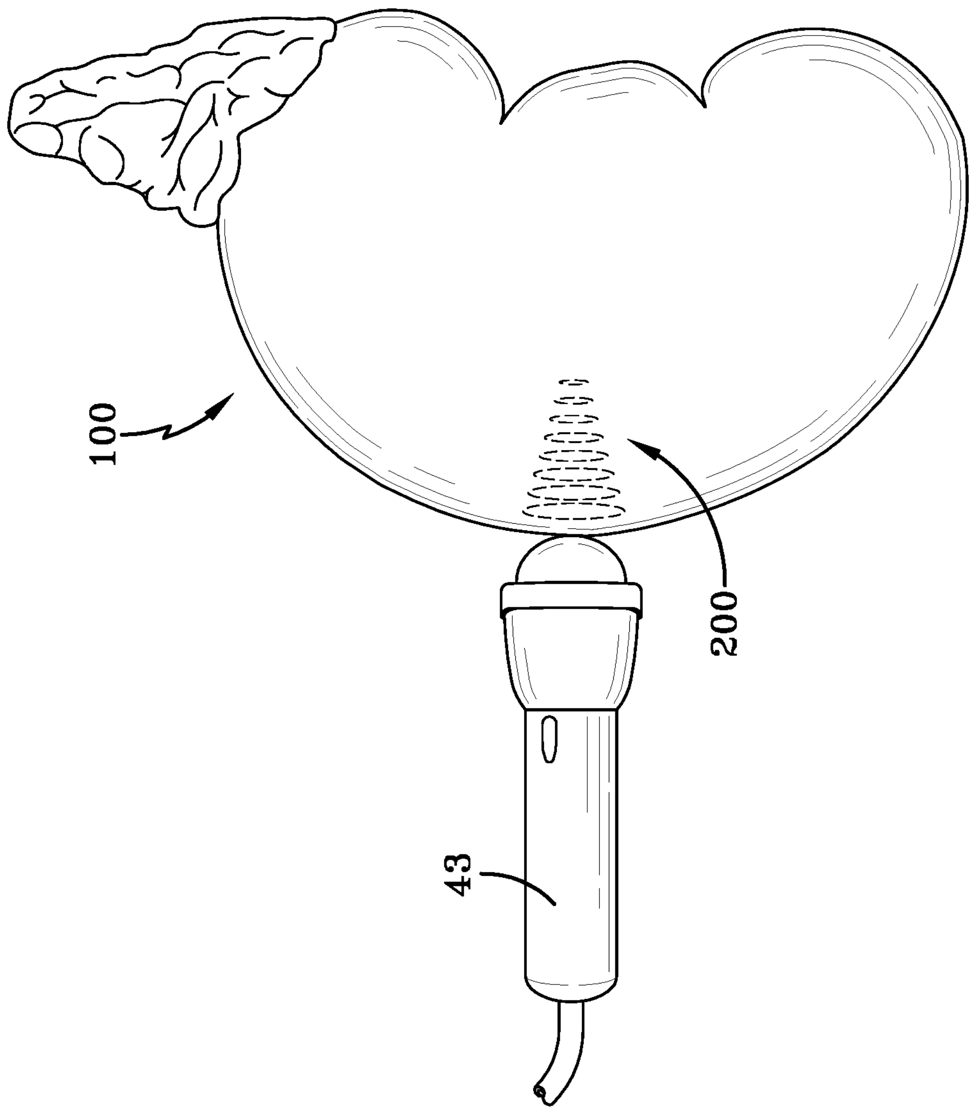
FIG. 7A is a perspective view of a kidney being treated with a shock wave or pressure pulse applicator.
Figure 7B:
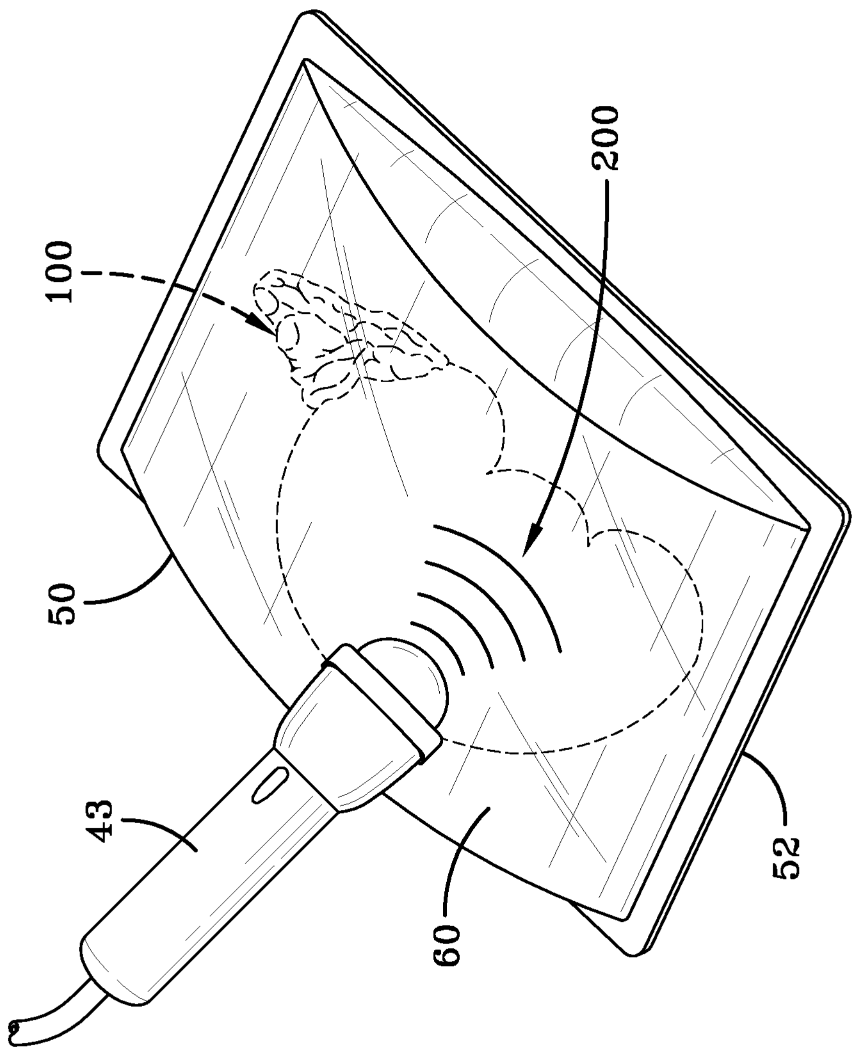
FIG. 7B is a perspective view of a kidney in a container being treated with a shock wave or pressure pulse applicator.

In FIGS. 7A and 7B a kidney is shown as the organ 100 being treated. In this fashion the kidney similar to the liver or heart can be treated such that the shock wave applicator 43 can be in direct or near contact in an unobstructed path to admit shock waves 200 to this organ. This has the added benefit of generating maximum therapy to the harvested organ in such a way that the kidney can be stimulated more directly. Again, in each of these procedures as shown there is an invasive technique requiring the shock wave applicator 43 to enter the organ 100 which is fully exposed to the exemplary shock waves 200 as can either be accomplished by a surgical harvesting procedure or any other means that would permit entry of the shock wave applicator 43 to the harvested organ. FIG. 7B shows the kidney 100 being treated in a container 50 filled with preservative fluid 60 as was described above.

In each of the representative treatments as shown in FIGS. 5A-7B, the shock wave applicator 43 when used within a sterile sleeve or covering may simply be disinfected using a suitable antimicrobial disinfecting agent prior to use. Alternatively, the applicator 43 can be sterilized when used without a sterile sleeve. The sleeves or coverings, not shown, are preferably disposable and should be discarded after use. When treating any tissue or organ 100 the sterile sleeve holding the applicator 43 or in the case of using the applicator 43 without a sleeve the tissue contacting surface should be coupled acoustically by using known means such as sterile fluids or viscous gels like ultrasound gels or even NaCl solutions to couple the transmitted shock wave into the organ in an aseptic sterile fashion.

FIG. 8 is a graph depicting an exemplary ultrasound wave form or pattern. As shown, the ultrasonic wave pattern is a symmetrical uniform sinusoidal pattern. The positive and negative amplitudes are equal as is the rise time to peak pressure midway and the negative part of the wave. This ultrasound wave pattern exhibits heat generation and can be cell membrane damaging. Most importantly, absolutely heat destroys cells.

FIG. 9 is a graph depicting an exemplary sound wave form or pattern. In contrast to FIG. 8, the acoustic shock wave pattern is asymmetrical having a rapid rise to peak pressure followed by a slower negative portion. This acoustic wave has virtually no heat generation and can, when delivered at low energy pulses, pass through cell membranes with no cavitation effects.

In the figures, exemplary shock waves 200 are illustrated, it must be appreciated that any of the recognized shock wave patterns can be used in the shock wave treatment of the various harvested organs or tissues 100.

As illustrated, the device shown is an electrohydraulic acoustic shock wave generator, however, other devices that generate acoustic shock waves or pressure pulses can be used. Ultrasonic devices may be considered, but there is no data to support a sinusoidal wave form would work and therefore not considered as effective as the asymmetric wave generators. The acoustic shock waves or pressure pulses activate a cellular response within the reflexology treatment site. This response or stimulation causes an increase of nitric oxide and a release of a variety of growth factors such as VEGF and a release of anti-microbial peptides like LL37. As shown, the flexible membrane is protruding outward and the applicator 43 has been filled with fluid, the transmission or emission of acoustic shock waves or pressure pulses 200 is directed towards the organ 100.

The transmission of the shock waves 200 can be of a low energy density of 0.2 $mJ/mm^2$ whether using focused or unfocused shock waves. The acoustic shock waves or pressure pulses pulse rapidly through the cells penetrating the cell membrane extremely rapidly due to the rapid rise to peak time and pass through exiting slower due to the slower return from peak amplitude. This asymmetric wave pattern rapidly compresses each cell on entry and slow decompresses the cell as it exits. This effective squeezing of each cell is believed to cause the release of growth factors such as VEGF and others and also creates nitric oxide, all beneficial to new blood vessel formation. This occurs as a transmission across the cell membranes without rupturing the native cells.

Furthermore, such acoustic shock wave forms can be used in combination with drugs, chemical treatments, irradiation therapy or even physical therapy and when so combined the stimulated cells will more rapidly assist the body's natural healing response and thus overcomes the otherwise potentially tissue damaging effects of these complimentary procedures.

The present invention provides an apparatus for an effective treatment of indications in harvested organs or tissues, which benefit from high or low energy pressure pulse/shock waves having focused or unfocused, nearly plane, convergent or even divergent characteristics. With an unfocused wave having nearly plane, plane, convergent wave characteristic or even divergent wave characteristics, the energy density of the wave may be or may be adjusted to be so low that side effects including pain are very minor or even do not exist at all.

In certain embodiments, the apparatus of the present invention is able to produce waves having energy density values that are below 0.1 $mJ/mm^2$ or even as low as 0.000001 $mJ/mm^2$. In a preferred embodiment, those low end values range between 0.1-0.001 $mJ/mm^2$. With these low energy densities, side effects are reduced and the dose application is much more uniform. Additionally, the possibility of harming surface tissue is reduced when using an apparatus of the present invention that generates unfocused waves having planar, nearly plane, convergent or divergent characteristics and larger transmission areas compared to apparatuses using a focused shock wave source that need to be moved around to cover the affected area. The apparatus of the present invention also may allow the user to make more precise energy density adjustments than an apparatus generating only focused shock waves, which is generally limited in terms of lowering the energy output. Nevertheless, in some cases the first use of a high energy focused shock wave targeting a treatment zone may be the best approach followed by a transmission of lower energy unfocused wave patterns.

Tissue is strengthened, inflammation reduced, nerves regenerated, and stem cells recruited and activated. All acoustic waves, focused and unfocused, spherical, radial, ballistic, etc. could be used for treatments.

It will be appreciated that the apparatuses and processes of the present invention can have a variety of embodiments, only a few of which are disclosed herein. It will be apparent to the artisan that other embodiments exist and do not depart from the spirit of the invention. Thus, the described embodiments are illustrative and should not be construed as restrictive.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of treating a harvested organ for preservation for implantation into a patient, comprising the steps of:

removing at least some of an infected portion of the organ therefrom;

flushing blood from the harvested organ;

placing the harvested organ into a container after said flushing;

filling the container with a liquid preservation composition;

sealing the container after performing said removing, said flushing, said placing and said filling, wherein said sealing comprises causing residual air to be removed from within the container prior to completion of said sealing;

subjecting the harvested organ in the container to a first shock wave treatment, wherein said subjecting comprises directing one or more pressure pulses into the container through an exterior surface thereof for impingement upon at least a portion of the harvested organ after said sealing to stimulate tissue cells of the harvested organ for triggering a cellular response causing a reduction in inflammation within tissue of the harvested organ and/or weakening of a protective outer barrier of an infection within tissue of the harvested organ, and wherein each of the one or more pressure pulses is an asymmetric acoustic shock wave;

administering into the container prior to said storing at least one of an anti-viral medication, an antibiotic medication, and an anti-fungal medication;

storing the container containing the harvested organ at a hypothermic temperature after said subjecting; and while the harvested organ remains sealed within the container and during said storing, subjecting the harvested organ to at least a second shock wave treatment separated from the first shock wave treatment by an intervening dwell period sufficient to permit cellular relaxation of tissue cells of the harvested organ between the first and second shock wave treatments, wherein the first shock wave treatment is performed at least one of prior to said administering and prior to said storing.

2. The method of claim 1, wherein the container is configured to enable transmission of the one or more pressure pulses through the exterior surface thereof to the liquid preservation composition and the harvested organ contained therein.

3. The method of claim 2, wherein the container is a flexible bag.

4. The method of claim 1, wherein said directing the one or more pressure pulses into the container comprises placing a pressure pulse emitting applicator against an external surface of the container.

5. The method of claim 1, wherein the container is a flexible bag and after said sealing, secondarily sealing a perimeter of the bag to tension the bag and create a positive pressure inside the bag.

6. The method of claim 1, wherein the at least one shock wave treatment causes a disruption of cellular membranes and a cellular communication, thereby causing the tissue cells of the harvested organ to identify and attack at least one of bacteria, mold, fungi, and virus within the harvested organ and further causing at least one of recruiting and stimulating an increase in anti-microbial peptides.

7. The method of claim 1 wherein each of the one or more pressure pulses is an unfocused pressure pulse.

8. A method of treating a harvested organ for preservation for implantation into a patient, comprising the steps of:

flushing blood from the harvested organ;

placing the harvested organ into a container after said flushing;

filling the container with a liquid preservation composition;

sealing the container after performing said flushing, said placing and said filling, wherein said sealing comprises ensuring residual air is removed from within the container prior to completion of said sealing;

subjecting the harvested organ in the container to a first shock wave treatments, wherein said subjecting comprises directing one or more pressure pulses into the container through an exterior surface thereof for impingement upon at least a portion of the harvested organ after said sealing to stimulate tissue cells of the harvested organ for triggering a cellular response causing a reduction in inflammation within tissue of the harvested organ and/or weakening of a protective outer barrier of an infection within tissue of the harvested organ, and wherein each of the one or more pressure pulses is an asymmetric acoustic shock wave;

administering a medication into the container, wherein the at least one shock wave treatment is performed prior to said administering;

storing the container containing the harvested organ at a hypothermic temperature after said administering; and while the harvested organ remains sealed within the container and during said storing, subjecting the harvested organ to at least a second shock wave treatment separated from the first shock wave treatment by an intervening dwell period sufficient to permit cellular relaxation of tissue cells of the harvested organ between the first and second shock wave treatments.

9. The method of claim 8 wherein each of the one or more pressure pulses is an unfocused pressure pulse.

10. A method of treating a harvested organ for preservation for implantation into a patient, comprising the steps of:

flushing blood from the harvested organ;

placing the harvested organ into a container after said flushing;

filling the container with a liquid preservation composition;

sealing the container after performing said flushing, said placing and said filling, wherein said sealing comprises ensuring residual air is removed from within the container prior to completion of said sealing;

subjecting the harvested organ in the container to a first shock wave treatments, wherein each shock wave treatments comprises directing one or more pressure pulses into the container through an exterior surface thereof for impingement upon at least a portion of the harvested organ after said sealing to stimulate tissue cells of the harvested organ for triggering a cellular response causing a reduction in inflammation within tissue of the harvested organ and/or weakening of a protective outer barrier of an infection within tissue of the harvested organ, and wherein each of the one or more pressure pulses is an asymmetric acoustic shock wave;

administering a medication into the container, wherein the first shock wave treatments is performed prior to said administering and a second shock wave treatments is performed after said administering;

storing the container containing the harvested organ at a hypothermic temperature after the second shock wave treatments is performed, wherein the second shock wave treatment is separated from the first shock wave treatment by an intervening dwell period sufficient to permit cellular relaxation of tissue cells of the harvested organ between the first and second shock wave treatments.

11. The method of claim 10 wherein each of the one or more pressure pulses is an unfocused pressure pulse.

12. The method of claim 8, further comprising the step of:

prior to the first shock wave treatment, secondarily sealing a perimeter of the container to create a positive pressure inside the container, wherein the container is a flexible bag.

13. The method of claim 10, further comprising the step of:

prior to the first shock wave treatment, secondarily sealing a perimeter of the container to create a positive pressure inside the container, wherein the container is a flexible bag.

14. A method of treating a harvested organ, comprising:

removing at least some of an infected portion of a harvested organ therefrom;

placing the harvested organ into a container;

filling the container with a liquid preservation composition;

sealing the container after performing said placing and said filling to contain the liquid preservation composition within the container, wherein said sealing comprises ensuring residual air is removed from within the container prior to completion of said sealing;

subjecting the harvested organ in the container to a first shock wave treatment after said sealing, wherein the first shockwave treatment comprises directing one or more pressure pulses into the container through an exterior surface thereof and wherein each of the one or more pressure pulses of the first shockwave treatment is an asymmetric acoustic shock wave;

storing the container containing the harvested organ at a hypothermic temperature after subjecting the harvested organ in the container to the first shock wave treatment; and subjecting the harvested organ in the container to a second shock wave treatment during said storing, wherein the second shockwave treatment comprises directing one or more pressure pulses into the container through an exterior surface thereof and wherein each of the one or more pressure pulses of the second shockwave treatment is an asymmetric acoustic shock wave, and wherein the second shock wave treatment is separated from the first shock wave treatment by an intervening dwell period sufficient to permit cellular relaxation of tissue cells of the harvested organ between the first and second shock wave treatments.

15. The method of claim 14, further comprising the step of:

prior to the first shock wave treatment, secondarily sealing a perimeter of the container to create a positive pressure inside the container, wherein the container is a flexible bag.

16. The method of claim 14 wherein the liquid preservation composition comprises at least one of an anti-viral medication, an antibiotic medication, and an anti-fungal medication.

17. The method of claim 16, further comprising the step of:

prior to the first shock wave treatment, secondarily sealing a perimeter of the container to create a positive pressure inside the container, wherein the container is a flexible bag.

18. The method of claim 14, further comprising:

prior to said storing after subjecting the harvested organ in the container to the first shock wave treatment, administering into the container at least one of an anti-viral medication, an antibiotic medication, and an anti-fungal medication.

19. The method of claim 18, further comprising the step of:

prior to the first shock wave treatment, secondarily sealing a perimeter of the container to create a positive pressure inside the container, wherein the container is a flexible bag.

* * * * *